(12) United States Patent
Acharya et al.

(10) Patent No.: US 12,518,463 B2
(45) Date of Patent: Jan. 6, 2026

(54) GRAPHICS PROCESSING UNIT RENDER MODE SELECTION SYSTEM

(71) Applicant: ADVANCED MICRO DEVICES, INC., Santa Clara, CA (US)

(72) Inventors: Anirudh R. Acharya, San Diego, CA (US); Ruijin Wu, San Diego, CA (US); Young In Yeo, San Diego, CA (US); Mika Tuomi, Noomarkku (FI); Kiia Kallio, Noormarkku (FI)

(73) Assignee: Advanced Micro Devices, Inc., Santa Clara, CA (US)

( * ) Notice: Subject to any disclaimer, the term of this patent is extended or adjusted under 35 U.S.C. 154(b) by 175 days.

(21) Appl. No.: 17/008,292

(22) Filed: Aug. 31, 2020

(65) Prior Publication Data

US 2021/0287418 A1 Sep. 16, 2021

Related U.S. Application Data

(60) Provisional application No. 62/987,469, filed on Mar. 10, 2020.

(51) Int. Cl.
*G06T 15/00* (2011.01)
*G06F 7/24* (2006.01)
*G06T 1/20* (2006.01)
*G06T 1/60* (2006.01)

(52) U.S. Cl.
CPC .............. *G06T 15/005* (2013.01); *G06F 7/24* (2013.01); *G06T 1/20* (2013.01); *G06T 1/60* (2013.01)

(58) Field of Classification Search
CPC . G06T 15/005; G06T 1/60; G06T 1/20; G06F 7/24; G06F 9/44
See application file for complete search history.

(56) References Cited

U.S. PATENT DOCUMENTS

| 8,830,246 | B2 | 9/2014 | Seetharamaiah et al. |
| 8,982,136 | B2 | 3/2015 | Ribble et al. |
| 9,256,975 | B2* | 2/2016 | Heggelund ............... G06T 1/20 |
| 9,799,088 | B2 | 10/2017 | Frascati et al. |
| 2011/0148919 | A1* | 6/2011 | Heggelund ........... G06T 15/005 |
| | | | 345/629 |
| 2012/0293519 | A1* | 11/2012 | Ribble ...................... G06T 1/20 |
| | | | 345/501 |
| 2013/0135329 | A1 | 5/2013 | Seetharamaiah et al. |

(Continued)

OTHER PUBLICATIONS

U.S. Appl. No. 62/963,414, filed Jan. 20, 2020 in the name of Mika Tuomi.

(Continued)

*Primary Examiner* — Devona E Faulk
*Assistant Examiner* — Donna J. Ricks

(57) ABSTRACT

A processor dynamically selects a render mode for each render pass of a frame based on the characteristics of the render pass. A software driver of the processor receives graphics operations from an application executing at the processor and converts the graphics operations into a command stream that is provided to the graphics pipeline. As the driver converts the graphics operations into the command stream, the driver analyzes each render pass of the frame to determine characteristics of the render passes, and selects a render mode for each render pass based on the characteristics of the render pass.

20 Claims, 5 Drawing Sheets

COARSE BIN RENDERING
402

PRIMITIVE BATCH-BASED BIN RENDERING
404

COARSE BINNING WITH BATCH-BASED BIN RENDERING
404

IMMEDIATE MODE RENDERING
406

(56) References Cited

U.S. PATENT DOCUMENTS

| | | | |
|---|---|---|---|
| 2013/0135341 A1* | 5/2013 | Seetharamaiah | G06T 15/005 |
| | | | 345/619 |
| 2016/0055608 A1 | 2/2016 | Frascati et al. | |
| 2016/0163014 A1 | 6/2016 | Yang et al. | |
| 2017/0140573 A1 | 5/2017 | Woo | |
| 2018/0150296 A1 | 5/2018 | Min-Young et al. | |
| 2018/0165788 A1 | 6/2018 | Balci et al. | |
| 2019/0235917 A1* | 8/2019 | Koneru | G06F 9/4843 |

OTHER PUBLICATIONS

International Search Report malled Jun. 24, 2021 issued in Application No. PCT/US2021/021550, 10 pages.
International Preliminary Report on Patentability mailed Sep. 6, 2022 issued in Application No. PCT/US2021/021550, 6 pages.
International Search Report mailed Jun. 24, 2021 issued in Application No. PCT/US2021/021550, 10 pages.
Japanese Office Action mailed Nov. 26, 2024 for Japanese Patent Application No. 2022-551270, 9 pages.
Indian Office Action mailed May 6, 2024 for Indian Patent Application No. 202217049448, 6 pages.
Korean Office Action mailed Jun. 23, 2025 for Korean Patent Application No. 10-2022-7031430, 13 pages.
Extended European Search Report issued in Application No. 21768692. 2, mailed Feb. 20, 2024, 8 pages.

* cited by examiner

GRAPHICS PROCESSING UNIT RENDER MODE SELECTION SYSTEM

CROSS-REFERENCE TO RELATED APPLICATIONS

The present application claims priority to Provisional Patent Application Ser. No. 62/987,469, entitled "Graphics Processing Unit Render Mode Selection System" and filed on Mar. 10, 2020, the entirety of which is incorporated by reference herein.

BACKGROUND

A conventional graphics pipeline for processing three-dimensional (3-D) graphics is formed of a sequence of programmable shaders and fixed-function hardware blocks. Software applications generate frames for rendering by the graphics pipeline and provide the frames to a command processor at the front end of the graphics pipeline. The frames are subdivided into primitives such as triangles or patches that represent portions of objects in the image represented by the frame. For example, the primitives can represent portions of a 3-D model of an object that is visible in the frame. A graphics pipeline processes each primitive in response to a draw call and provides the processed primitives to a shader subsystem, which performs shading of the primitives. The graphics pipeline also includes a rasterizer to perform rasterization of the primitives and a binner to group the primitives into bins, or tiles, that are associated with different portions of the frame. The bins of primitives are then provided to the shader subsystem for additional shading prior to being rendered on a display. The shaders or fixed function hardware blocks in the graphics pipeline can concurrently process different primitives or bins of the same frame. For example, the graphics engine, the shader subsystem, rasterizer, and binner can concurrently process different primitives that represent a portion of the frame.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
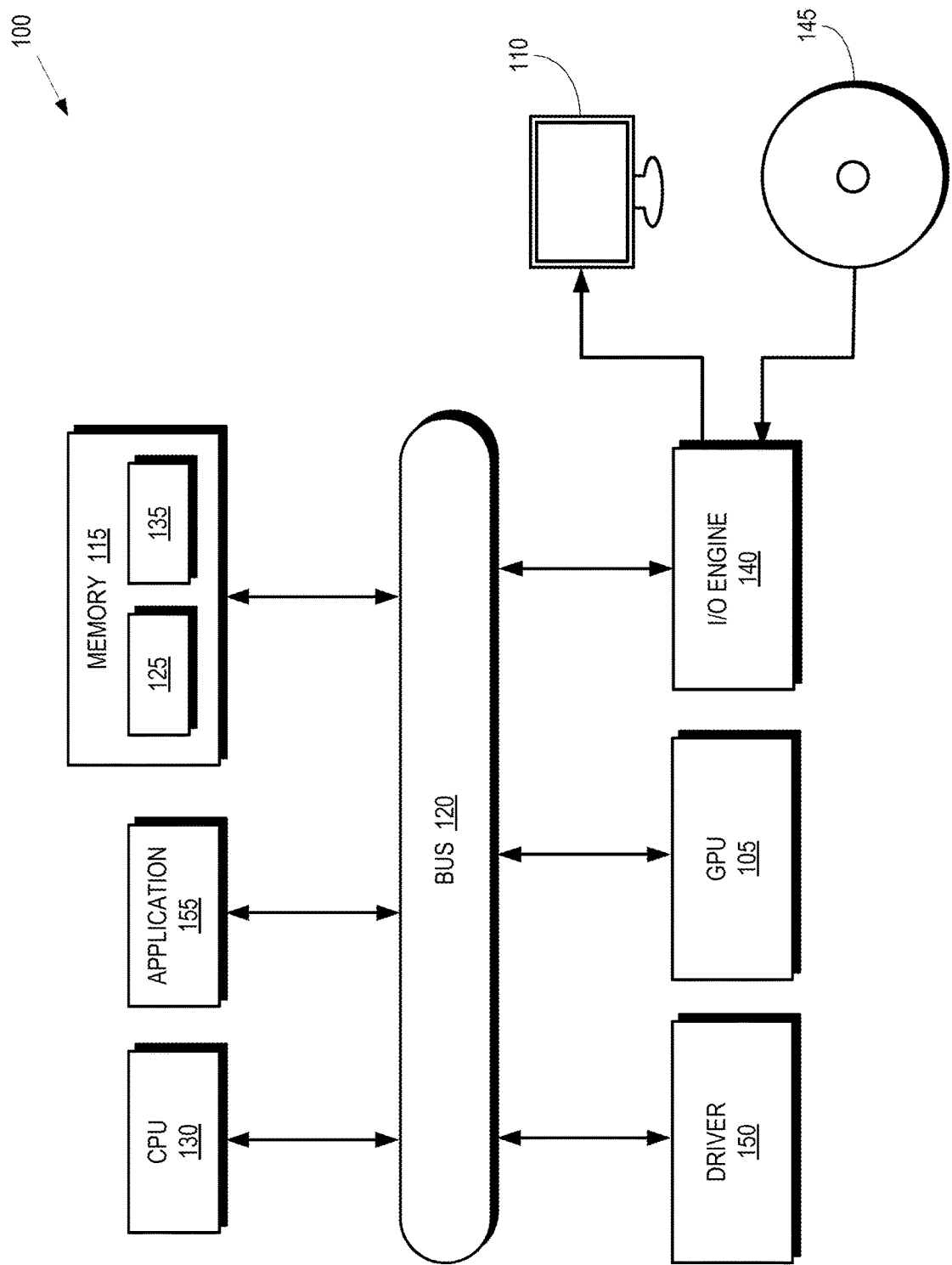
FIG. 1 is a block diagram of a processing system that that implements render mode selection on a per-render-pass basis for a graphics pipeline implemented by a graphics processing unit (GPU) for creating visual images intended for output to a display according to some embodiments.

To render and process data efficiently, graphics processing units (GPUs) include graphics pipelines that are dedicated to processing and rendering 3D computer graphics, images, video, and the like. Each frame is rendered by the pipelines using primitives that include points, lines, polygons or a combination of primitives that are organized into a mesh. The primitives in each frame or image are drawn individually by determining which pixels fall within the edges of the primitives and calculating the attributes of the primitive that corresponds to each of those pixels. Many graphics pipelines employ deferred shading, in which each frame is processed by the graphics pipeline over the course of multiple render passes. For example, in some embodiments, on the first pass of a deferred shader, only data that is required for shading computation is gathered. Positions, normals, and materials for each surface are rendered into a geometry buffer (G-buffer). In a subsequent render pass, a pixel shader computes the direct and indirect lighting at each pixel using the information of the texture buffers in screen space. A graphics driver generates a command stream for each render pass and stores the command stream in a GPU command buffer such as an indirect buffers (IB) (also referred to as a sub-command buffer (SCB)) specific to the render pass for consumption by the graphics pipeline.

A graphics pipeline supports multiple render modes, such as coarse bin rendering (CBB), primitive batch-based bin rendering (PBB), coarse binning with batch-based bin rendering (CPBB), and immediate-mode rendering (IMR), wherein each mode performs different rendering operations, resulting in differences in the rendered image depending on the rendering mode used. Typically, a GPU supports a default mode of either a binning mode or IMR in hardware. The supported default mode is therefore used for an entire frame before the frame is processed by the graphics pipeline and is used for each of the multiple render passes of the frame. However, each mode has advantages and disadvantages and is suited to particular types of render passes.

FIGS. 1-5 illustrate techniques for dynamically selecting a render mode for each render pass (also referred to as a set of drawcalls) of a frame based on the characteristics of the render pass. A software driver of a processor receives graphics operations from an application executing at the processor and converts the graphics operations into a command stream that is provided to the graphics pipeline. As the driver converts the graphics operations into the command stream, the driver analyzes each render pass of a frame to determine characteristics of the render passes, and selects a render mode for each render pass based on the characteristics of the render pass. For example, coarse binning with primitive batch binning (CPBB) is suited to typical geometry buffer (Gbuffer) render passes. Coarse bin rendering (CBB) mode is well suited to a render pass having a large number of primitives or an extra geometry heavy Gbuffer. Primitive batch-based bin (PBB) rendering mode is suitable for lighting and color render passes, and for render passes for which an occlusion query occurs. Immediate mode rendering (IMR) is best suited to post processing render passes. By selecting a render mode that is suited to the characteristics of the render pass, the driver enhances processing performance and efficiency.

In some embodiments, the driver modifies the command stream to indicate the selected render mode to the graphics pipeline. For example, in some embodiments the driver "patches" the command stream by inserting a token into the command stream corresponding to the render pass indicating the render mode that the graphics pipeline is to employ in executing the render pass. In some embodiments, the driver sorts each render pass into an indirect buffer for consumption by the graphics pipeline, and inserts the token indicating the render mode at the start of the IB. The graphics pipeline reads the token when it consumes the command stream for the render pass and switches to the selected render mode indicated by the token. By switching to the render mode that is suited to the render pass, the graphics pipeline improves image quality and efficiency. For fine grain control, in some embodiments, the driver inserts "start binning" and "end binning" commands in the IB and provides a pointer to preamble state at the start of binning.

FIG. 1 is a block diagram of a processing system 100 that includes a graphics processing unit (GPU) 105 for creating visual images intended for output to a display 110 according to some embodiments. The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 executes instructions stored in the memory 115 and the GPU 105 stores information in the memory 115 such as the results of the executed instructions. For example, the memory 115 can store a copy 125 of instructions from a program code that is to be executed by the GPU 105. Some embodiments of the GPU 105 include multiple processor cores (not shown in the interest of clarity) that independently execute instructions concurrently or in parallel.

The processing system 100 is generally configured to execute sets of instructions (e.g., computer programs) such as application 155 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

The processing system 100 includes a central processing unit (CPU) 130 for executing instructions. Some embodiments of the CPU 130 include multiple processor cores (not shown in the interest of clarity) that independently execute instructions concurrently or in parallel. The CPU 130 is also connected to the bus 120 and therefore communicates with the GPU 105 and the memory 115 via the bus 120. The CPU 130 executes instructions such as program code 135 stored in the memory 115 and the CPU 130 stores information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). Some embodiments of a draw call include information defining textures, states, shaders, rendering objects, buffers, and the like that are used by the GPU 105 to render the object or portion thereof. The GPU 105 renders the object to produce values of pixels that are provided to the display 110, which uses the pixel values to display an image that represents the rendered object.

Each frame to be rendered is processed by the GPU 105 graphics pipeline in multiple passes. For example, during a first pass over the scene geometry, only the attributes necessary to compute per-pixel lighting are written to the G-buffer. During a second pass, the graphics pipeline outputs only diffuse and specular lighting data. In a third pass of the frame through the graphics pipeline, the graphics pipeline reads back lighting data and outputs the final per-pixel shading. Thus, in multi-pass rendering, a scene and associated objects of a frame are rendered multiple times. Each time the object is drawn, the graphics pipeline calculates an additional aspect of object's appearance and combines the additional aspect with the previous results. Each time the frame or objects of the frame are rendered by the graphics pipeline is referred to as a render pass.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 communicates with the GPU 105, the memory 115, or the CPU 130. In the illustrated embodiment, the I/O engine 140 is configured to read information stored on an external storage medium 145, such as a compact disk (CD), a digital video disc (DVD), and the like. The external storage medium 145 stores information representative of program code used to implement an application such as a video game. The program code on the external storage medium 145 can be written to the memory 115 to form the copy 125 of instructions that are to be executed by the GPU 105 or the CPU 130.

The GPU 105 implements a graphics pipeline (not shown in FIG. 1 in the interest of clarity) that includes multiple stages configured for concurrent processing of different primitives in response to a draw call. Stages of the graphics pipeline in the GPU 105 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

Driver 150 is a computer program that allows a higher-level graphics computing program, such as from application 155, to interact with GPU 105. For example, driver 150 translates standard code received from application 155 into a native format command stream understood by GPU 105. Driver 155 allows input from application 155 to direct settings of GPU 105. Such settings include selection of a render mode, an anti-aliasing control, a texture filter control, a batch binning control, and deferred pixel shading control.

The performance of the graphics pipeline is enhanced by the driver 150 choosing the appropriate render mode for each render pass. To improve processing performance and efficiency, the driver 150 includes a render mode selection engine (not shown at FIG. 1) that is configured to receive a set of drawcalls for a render pass and determine a render mode for the render pass based on characteristics of the set of drawcalls. For example, in some embodiments the graphics pipeline supports multiple render modes, such as coarse bin rendering (CBB), primitive batch-based bin rendering (PBB), coarse binning with batch-based bin rendering (CPBB), and immediate-mode rendering (IMR). For CBB render mode, the graphics pipeline bins drawcalls with large tiles across the screen. For example, for 1080p render target, the graphics pipeline divides the screen into multiple 512× 512 pixel bins. In some embodiments, the CBB render mode bins drawcalls at a command buffer of the graphics pipeline.

For PBB render mode, the graphics pipeline bins a limited set of drawcalls and primitives in on-chip memory across the screen. For example, in PBB render mode the graphics pipeline divides the screen into smaller bins such as 64×64 pixels. In some embodiments, the PBB render mode bins drawcalls deeper in the graphics pipeline post culling operation.

For the CPBB render mode, the graphics pipeline performs hybrid two-level binning: in the first level, the graphics pipeline divides the screen into large bins, such as 512×512 pixels, and in the second level, the graphics pipeline divides a limited set of drawcalls and primitives within a large bin into smaller bins, such as 64×64 pixel bins.

For IMR, the graphics pipeline does not perform coarse or primitive-batch binning, but instead renders the screen in the order that drawcalls and primitives are received from the application 155.

As the driver 150 converts standard code received from the application 155 into a native format command stream understood by GPU 105, the driver 150 analyzes each set of drawcalls included in a render pass and determines which render mode the graphics pipeline is to employ to execute the render pass. The driver 150 indicates the selected render mode to the graphics pipeline by modifying the command stream for the set of drawcalls to include a token indicating the selected render mode. As the graphics pipeline consumes the command stream, the graphics pipeline reads the token and implements the indicated selected render mode.

In some embodiments, the driver 150 overrides the render mode it previously selected for a render mode in the event the driver 150 determines that the selected render mode is incompatible or non-optimal for the render pass. For example, if the driver 150 selects a binning render mode such as CBB or CPBB for a render pass and during processing of the render pass a condition changes such as a user inserting an occlusion query or using shader operations that alter memory consistency (such as writing to Unordered Access Views (UAV), the driver "patches" the command stream to include a token indicating a render mode that is compatible with the changed condition. In some embodiments, if the driver 150 overrides the selected render mode, the driver 150 signals the graphics pipeline to revert to a default render mode for the render pass.

Figure 2:
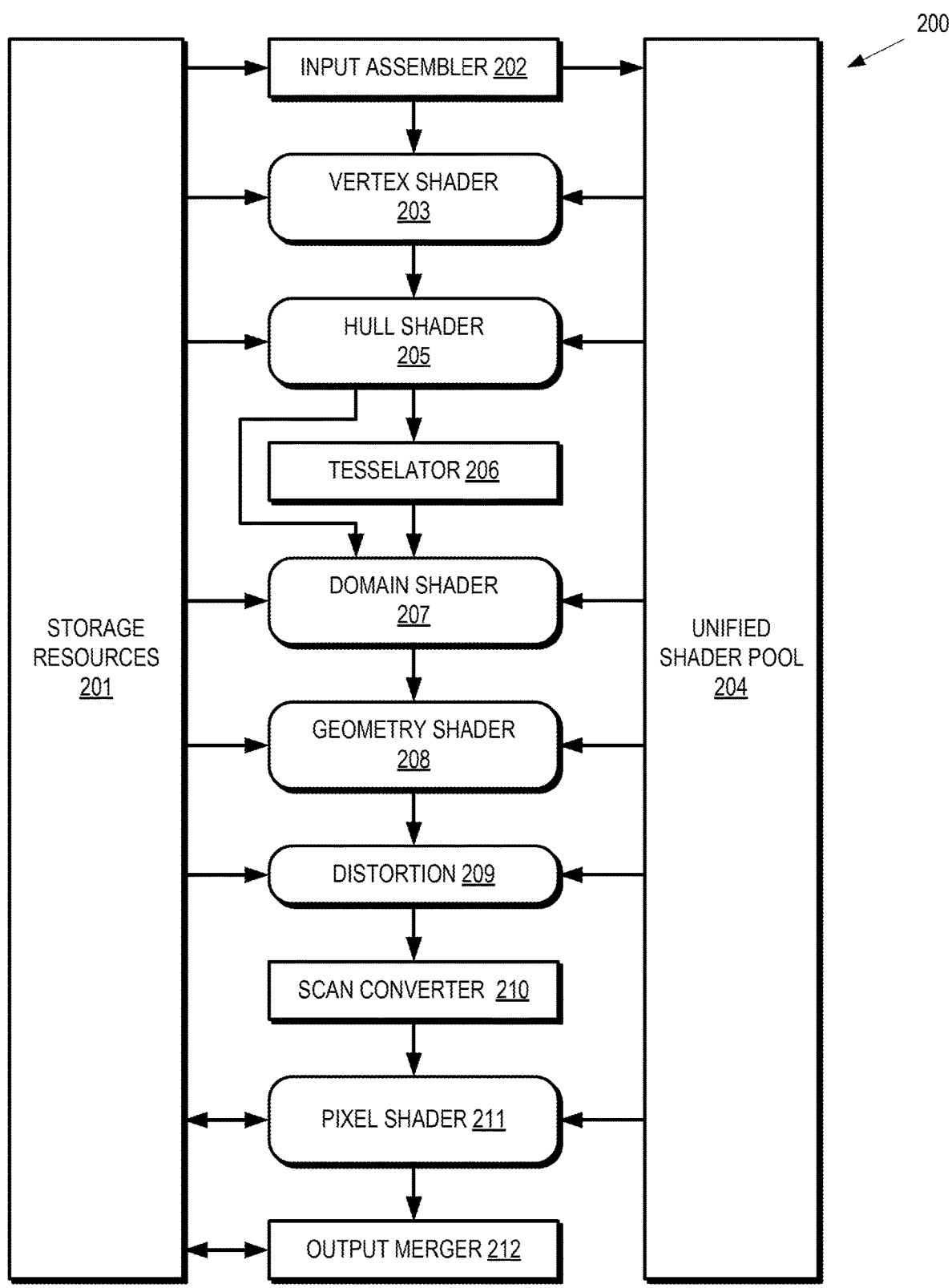
FIG. 2 depicts a graphics pipeline that is capable of processing high-order geometry primitives to generate rasterized images of three-dimensional (3-D) scenes according to some embodiments.

FIG. 2 depicts a graphics pipeline 200 that is capable of processing high-order geometry primitives to generate rasterized images of three-dimensional (3-D) scenes at a predetermined resolution according to some embodiments. The graphics pipeline 200 is implemented in some embodiments of the GPU 105 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like.

The graphics pipeline 200 has access to storage resources 201 such as a hierarchy of one or more memories or caches that are used to implement buffers and store vertex data, texture data, and the like. The storage resources 201 can be implemented using some embodiments of the memory 115 shown in FIG. 1.

An input assembler 202 is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement single-instruction-multiple-data (SIMD) processing so that multiple vertices are processed concurrently. The graphics pipeline 200 shown in FIG. 2 implements a unified shader model so that all the shaders included in the graphics pipeline 200 have the same execution platform on the shared SIMD compute units. The shaders, including the vertex shader 203, are therefore implemented using a common set of resources that is referred to herein as the unified shader pool 204. Some embodiments of the unified shader pool 204 are implemented using processors in the GPU 105 shown in FIG. 1.

A hull shader 205 operates on input high-order patches or control points that are used to define the input patches. The hull shader 205 outputs tessellation factors and other patch data. Primitives generated by the hull shader 205 can optionally be provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives can be concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

As discussed herein, the driver 150 determines the render mode that is to be implemented by the graphics pipeline 200 and communicates the selected render mode to the graphics pipeline 200. The driver 150 receives a render pass including a set of draw calls from the application 155. The driver 150 analyzes the render pass to determine its characteristics. Based on the characteristics of the render pass and the efficiency requirements of the processing system 100, the driver 150 selects a render mode for the render pass. In some embodiments, the driver 150 modifies a command stream input to the graphics pipeline 200 at an indirect buffer to indicate the selected render mode. For example, in some embodiments, the driver 150 "patches" the command stream by inserting a token into indirect buffer at the start of the command stream.

Figure 3:
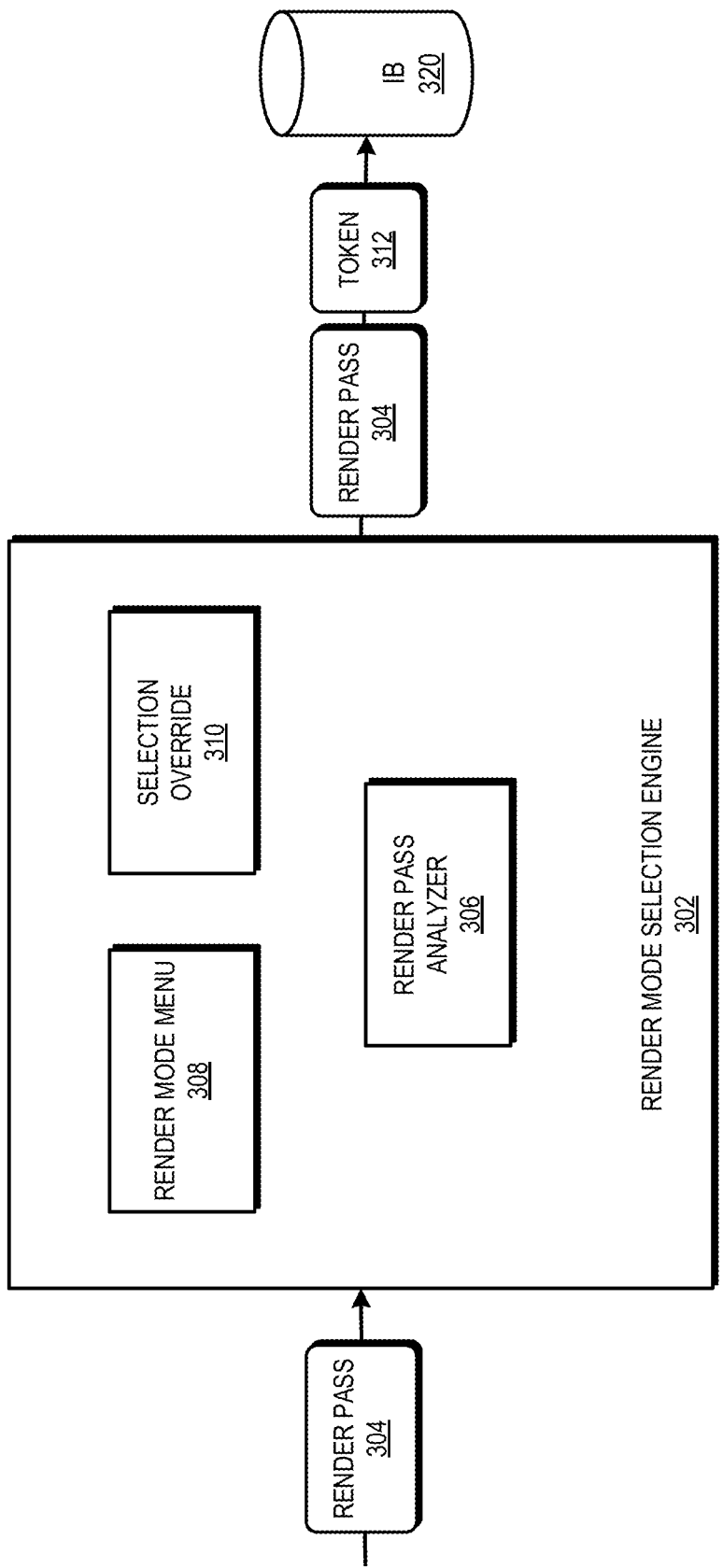
FIG. 3 is a block diagram of a render mode selection engine of a driver that implements render mode selection on a per-render-pass basis for a graphics pipeline implemented by the GPU according to some embodiments.

FIG. 3 is a block diagram of a render mode selection engine 302 of the driver 150 that implements render mode selection on a per-render-pass basis for the graphics pipeline 200 implemented by the GPU 105 according to some embodiments. The render mode selection engine 302 includes a render pass analyzer 306, a render mode menu 308, and a selection override 310, each of which may be implemented as hardware, firmware, software, or any combination thereof. The render mode selection engine 302 is configured to analyze each render pass of a frame, select a render mode for each render pass, and communicate the selected render pass to the graphics pipeline 200 by inserting a token in an indirect buffer 320 corresponding to the render pass.

The render pass analyzer 306 analyzes each render pass to determine characteristics of the render pass. In some embodiments, the characteristics determined by the render pass analyzer 306 include the number of primitives, the render target bound, whether the render pass includes an occlusion query, and whether render pass and sub-pass APIs are seen for the render pass. The render mode menu 308 includes a list of supported render modes of the graphics pipeline 200, such as CBB, PBB, CPBB, and IMR, and the heuristics that are to be applied in determining which render mode is suitable for render passes having particular characteristics. For example, in some embodiments, if the driver 150 encounters an occlusion query, the driver 150 selects IMR render mode for the render pass 304. In some embodiments, if the driver 150 encounters a sub-pass API, the driver 150 selects one of the binning render modes (such as CPBB, PBB, or CBB) based on the geometry complexity of the draw calls of the render pass 304. The selection override 310 is configured to override the selected render mode and revert to a default render mode if conditions change such that the selected render mode is no longer the optimal mode for the render pass. For example, if characteristics of the frame are updated, the selection override 310 may determine that the selected render mode is no longer optimal for the render pass.

In operation, the render mode selection engine 302 receives a render pass 304 from the application 155. The render pass analyzer 306 analyzes the render pass 404 to determine its characteristics. The render mode selection engine 302 selects a render mode for the render pass 304 from the render mode menu 308 based on the characteristics of the render pass 304. The render mode selection engine 302 modifies the command stream for the render pass 304 by inserting a token 312 indicating the selected render mode into the indirect buffer 320. In the event of changed conditions such that the selected render mode is no longer optimal for the render pass 304, the selection override 310 further modifies the command stream for the render pass 304 by inserting a token (not shown) in the indirect buffer 320 indicating that the graphics pipeline 200 is to revert to a default render mode for the render pass 304.

Figure 4:
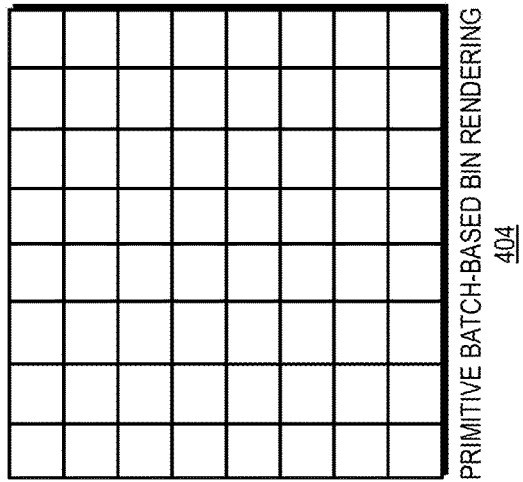
FIG. 4 illustrates four render modes selectable by a driver of the processing system to be employed by the graphic pipeline according to some embodiments.
Figure 4:
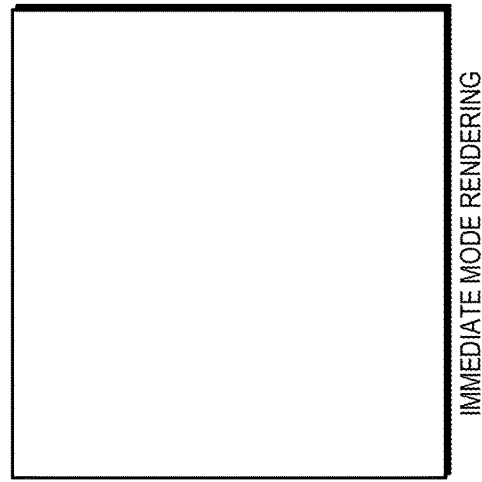
Figure 4:
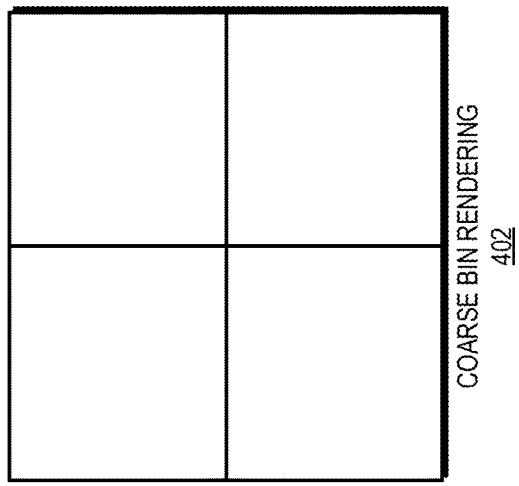
Figure 4:
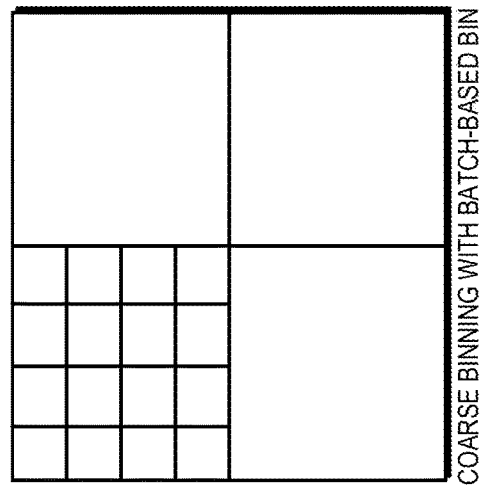

FIG. 4 illustrates four render modes selectable by a driver of the processing system to be employed by the graphic pipeline according to some embodiments. When employing coarse bin rendering (CBB) mode 402, the graphics pipeline 200 bins drawcalls into large tiles across the screen. For example, for a 1080p screen, which is 1920×1080 pixels, a graphics pipeline employing CBB mode 402 breaks the render target into multiple 512×512 pixel bins in some embodiments. In some embodiments, CBB mode 402 binning is performed at a command buffer of the graphics pipeline 200. CBB mode 402 is suitable for draw calls having a large number of primitives because CBB mode 402 uses external memory to store binning information, which provides enhanced storage capacity for increasing the number of draw calls that can be buffered and binned. Thus, in some embodiments, if the primitives count for a render pass exceeds a threshold, the driver 150 selects CBB mode 402 as the render mode for the render pass.

When using primitive batch-based bin (PBB) rendering mode 404, the graphic pipeline 200 bins a limited set of drawcalls and primitives in on-chip memory across the screen using smaller bins than CBB mode 402. For example, in some embodiments, PBB mode 404 uses 64×64 pixel bins. In some embodiments, PBB mode 404 binning is performed deeper in the graphics pipeline 200 than CBB mode 402, as a post culling operation. PBB mode 404 is suitable for draw calls having a threshold render target bound, such as a render target bound of 1, and for draw calls for which an occlusion query occurs. A render target bound of 1 in a deferred shading pipeline generally refers to lighting or post-processing render passes in which the number of primitives is low. PBB mode 404 stores binning information in on-chip memory to avoid memory accesses and improve performance and efficiency. Thus, in some embodiments, if the render target bound for a render pass equals a threshold value, or if the draw call invokes an occlusion query, the driver 150 selects PBB mode 404 as the render mode for the render pass.

In coarse binning with batch-based bin rendering (CPBB) mode 406, the graphics pipeline 200 employs a multi-level binning process in which the graphics pipeline first coarsely bins a screen into large bins, such as 512×512 pixels, and then bins a limited set of drawcalls and primitives in each 512×512 pixel bin into smaller 64×64 pixel bins. CPBB mode 406 is suitable for draw calls having a render target bound that exceeds the threshold that is used for PBB mode 404, as a high render target bound likely signifies a geometry buffer (Gbuffer) render pass. CPBB mode 406 is also suitable when render pass and sub pass application programming interfaces (APIs) are seen. The first level coarse binning breaks the screen into bins that are consumable by PBB mode. Thus, if the screen has several thousand primitives (triangle), coarse level binning divides the screen into regions and operates on only part of the screen. Each region of the screen likely has fewer primitives than the screen as a whole, and PBB mode can efficiently bin each region of the screen in on-chip memory. Thus, in some embodiments, if the render target bound for a render pass exceeds a threshold value, or if render pass and sub-pass APIs are seen, the driver 150 selects CPBB mode 404 as the render mode for the render pass.

In immediate mode rendering (IMR) 408, the graphics pipeline 200 is configured to render each primitive in a scene in the order the primitives were received by the pipeline. For example, a primitive can include a set of attributes such as x, y and z coordinates, color, or texture u, v coordinates corresponding to vertices of the primitive. Every forward-facing primitive in a scene is then rasterized and shaded (including interpolation, texturing, lighting and combining operations). IMR mode 408 is suitable for full screen drawcalls used in post-processing. Thus, if the driver 150 determines that a render pass involves full screen post-processing, the driver 150 selects IMR mode 408 for the render pass.

Figure 5:
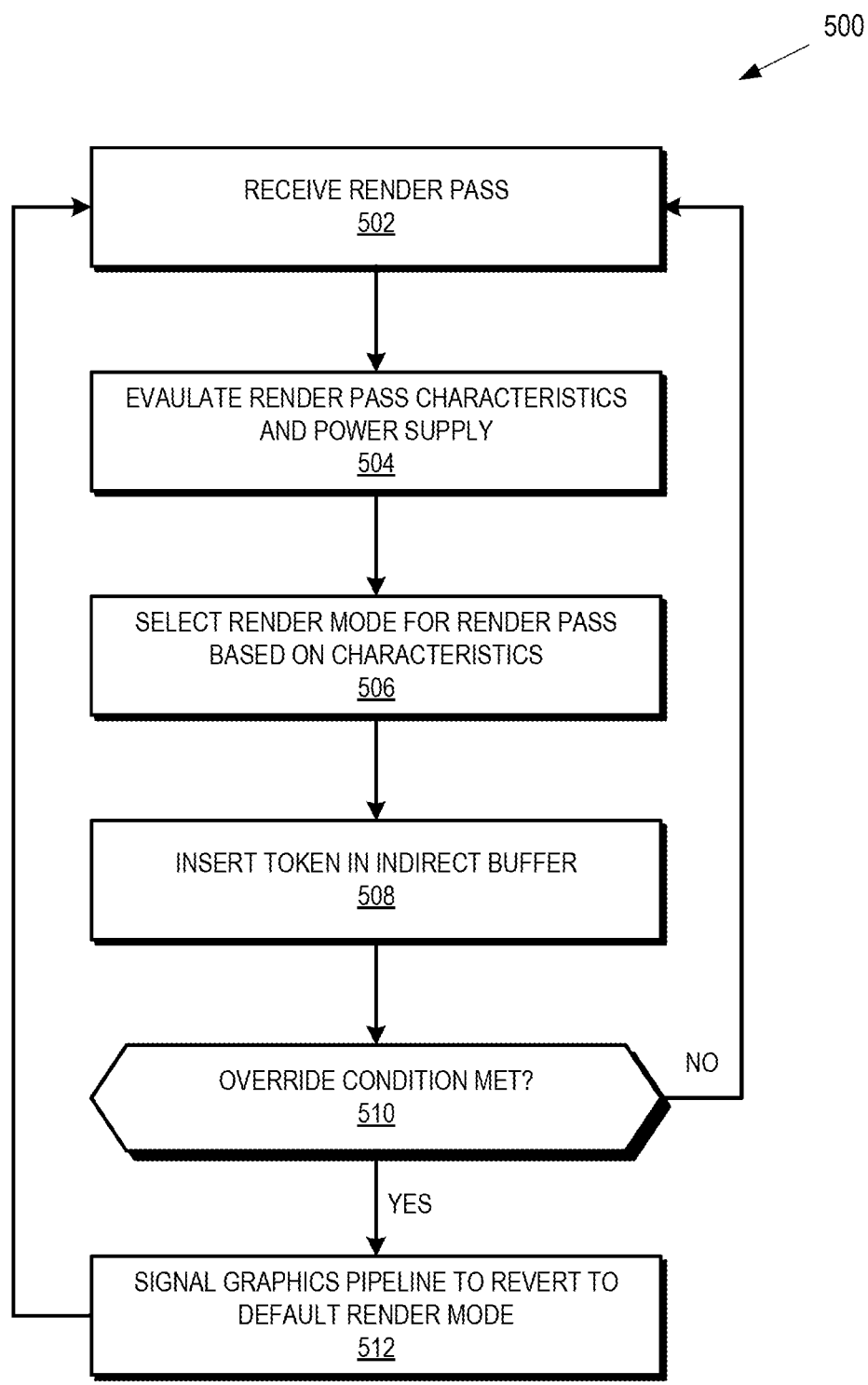
FIG. 5 is a flow diagram illustrating a method for selecting a render mode for a graphics pipeline on a per-render-pass basis in accordance with some embodiments.

FIG. 5 is a flow diagram illustrating a method 500 for selecting a render mode for a graphics pipeline on a perrender-pass basis in accordance with some embodiments. At block 502, the render mode selection engine 302 receives a render pass 304 from the application 155. At block 504, the render pass analyzer 306 evaluates characteristics of the render pass 304. At block 506, the render mode selection engine 302 selects a render mode for the render pass 304 from the render mode menu 310 based on the characteristics of the render pass 304. At block 508, the render mode selection engine 302 inserts a token indicating the selected render mode for the render pass 304 in the indirect buffer 320.

At block 510, the selection override 312 determines whether an override condition is met. In some embodiments, an override condition is met if the characteristics of the frame have been updated such that the selected render mode is no longer optimal for the render pass. If, at block 510, the selection override 312 determines that an override condition has been met, the method flow continues to block 512. At block 512, the selection override 312 signals to the graphics pipeline 200 to revert to a default render mode for the render pass 304. For example, in some embodiments, the selection override 312 further modifies the command stream for the render pass 304 by inserting a token in the indirect buffer 320 indicating that the graphics pipeline 200 is to revert to a default render mode for the render pass 304. The method flow then continues back to block 502. If, at block 510, the selection override 312 determines that an override condition has not been met, the method flow continues back to block 502.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   generating a plurality of command streams, wherein each command stream corresponds to a different render pass of a plurality of render passes for a frame;
   storing each command stream of the plurality of command streams in a respective command buffer of a plurality of corresponding command buffers;

selecting, for each render pass of the plurality of render passes for the frame, a render mode of a plurality of render modes based on characteristics of the render pass;

storing multi-bit tokens at respective command buffers, wherein each multi-bit token identifies the respective selected render mode for the corresponding render pass; and indicating from each corresponding command buffer to a graphics processing unit (GPU) of a processor each selected render mode for each render pass.

2. The method of claim 1, wherein indicating comprises inserting a command indicating the selected render mode for a render pass into the corresponding command stream to the GPU.

3. The method of claim 1, wherein for at least one of the respective command buffers, storing the multi-bit token comprises inserting a start binning command indicating the selected render mode for the corresponding render pass into the command buffer corresponding to the render pass and an end binning command following the command stream for the render pass.

4. The method of claim 1, wherein the characteristics of the render pass comprise at least one of: lighting, color, post-processing, occlusion query, whether a number of draw calls or primitives exceeds a threshold, use of unordered access views, and whether a number of render targets bound equals or exceeds a threshold.

5. The method of claim 1, wherein the selected render mode comprises one of: coarse bin rendering, primitive batch-based bin rendering, coarse binning with batch-based bin rendering, and immediate-mode rendering.

6. The method of claim 1, further comprising:
receiving an indication of an updated characteristic of the render pass; and
updating the selection of a render mode for a render pass for the frame in response to receiving an indication that the selected render mode is incompatible with the updated characteristic of the render pass.

7. The method of claim 1, further comprising:
performing a render pass for a frame at the GPU using the selected render mode for the render pass.

8. A method, comprising:
sorting a plurality of render passes for a frame into corresponding command buffers for a graphics processing unit (GPU) of a processor;
selecting a render mode of a plurality of render modes for each render pass based on characteristics of each render pass; and
for each render pass, storing a multi-bit token at the command buffer corresponding to the render pass to indicate the selected render mode for the render pass.

9. The method of claim 8, wherein storing the multi-bit token comprises inserting a command indicating the selected render mode for a render pass into a command stream to the GPU.

10. The method of claim 8, wherein the characteristics of the render pass comprise at least one of: lighting, color, post-processing, occlusion query, whether a number of draw calls or primitives exceeds a threshold, use of unordered access views, and whether a number of render targets bound equals or exceeds a threshold.

11. The method of claim 8, wherein the selected render mode comprises one of: coarse bin rendering, primitive batch-based bin rendering, coarse binning with batch-based bin rendering, and immediate-mode rendering.

12. The method of claim 8, wherein storing the multi-bit token comprises inserting a start binning command indicating the selected render mode for a render pass into the command buffer corresponding to the render pass and an end binning command following a command stream for the render pass.

13. The method of claim 8, further comprising:
receiving an indication of an updated characteristic of the render pass; and
updating the selection of a render mode for a render pass for the frame in response to receiving an indication that the selected render mode is incompatible with the updated characteristic of the render pass.

14. The method of claim 8, further comprising:
performing a render pass for a frame at the GPU using the selected render mode for the render pass.

15. A device, comprising:
a render mode selection circuit to select a render mode of a plurality of render modes for each render pass of a plurality of render passes based on characteristics of each render pass;
a plurality of command buffers to store respective render passes of the plurality of render passes for a frame and to store a respective multi-bit token that indicates the selected render mode for the respective render pass; and
a graphics processing unit (GPU) to process the render passes retrieved from the plurality of command buffers using the respective selected render modes.

16. The device of claim 15, wherein the render mode selection circuit is further configured to insert a start binning command indicating the selected render mode for a render pass into the respective command buffer and an end binning command following a command stream for the render pass.

17. The device of claim 15, wherein the render mode selection circuit is further configured to insert a command indicating the selected render mode for a render pass into a command stream to the GPU.

18. The device of claim 15, wherein the render mode selection circuit is to select the render mode based on at least one of: lighting, color, post-processing, occlusion query, whether a number of draw calls or primitives exceeds a threshold, use of unordered access views, and whether a number of render targets bound equals or exceeds a threshold.

19. The device of claim 15, wherein the plurality of render modes comprise coarse bin rendering, primitive batch-based bin rendering, coarse binning with batch-based bin rendering, immediate-mode rendering, or any combination thereof.

20. The device of claim 15, wherein the render mode selection circuit is further configured to:
receive an indication of an updated characteristic of the render pass; and
update the selection of a render mode for a render pass for the frame in response to receiving an indication that the selected render mode is incompatible with the updated characteristic of the render pass.

* * * * *